US008407787B1

(12) United States Patent
Lou et al.

(10) Patent No.: US 8,407,787 B1
(45) Date of Patent: Mar. 26, 2013

(54) COMPUTER APPARATUS AND METHOD FOR NON-INTRUSIVE INSPECTION OF PROGRAM BEHAVIOR

(75) Inventors: Vic Lou, Taipei (TW); Chung-Jen Tseng, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 906 days.

(21) Appl. No.: 12/357,979

(22) Filed: Jan. 22, 2009

(51) Int. Cl.
*G06F 21/00* (2006.01)

(52) U.S. Cl. ............... 726/22; 726/23; 726/24; 726/25

(58) Field of Classification Search ............ 726/22, 726/23, 24, 25; 717/134, 135
See application file for complete search history.

(56) References Cited

U.S. PATENT DOCUMENTS

| 7,103,913 | B2 | 9/2006 | Arnold et al. | |
|---|---|---|---|---|
| 7,188,369 | B2 | 3/2007 | Ho et al. | |
| 7,376,970 | B2 | 5/2008 | Marinescu | |
| 7,478,373 | B2 * | 1/2009 | Bond et al. | 717/138 |
| 2003/0135791 | A1 * | 7/2003 | Natvig | 714/38 |
| 2004/0199827 | A1 * | 10/2004 | Muttik et al. | 714/38 |
| 2005/0108562 | A1 * | 5/2005 | Khazan et al. | 713/200 |
| 2005/0187740 | A1 * | 8/2005 | Marinescu | 703/1 |
| 2008/0040710 | A1 * | 2/2008 | Chiriac | 717/136 |

OTHER PUBLICATIONS

Ferrie, "Anti-Unpacker Tricks", 2008, Paper presented at the 2nd International Caro Workshop, [retrieved on May 15, 2012]. Retrieved from the Internet: < URL: http://pferrie.host22.com/papers/unpackers.pdf >.*
Skape, "Preventing the Exploitation of SEH Overwrites", Sep. 2006, [retrieved on May 14, 2012]. Retrieved from the Internet: < URL: http://uninformed.org/?v=5&a=2&t=pdf >.*

* cited by examiner

*Primary Examiner* — Eleni Shiferaw
*Assistant Examiner* — Hilary Branske
(74) *Attorney, Agent, or Firm* — Okamoto & Benedicto LLP

(57) ABSTRACT

A computer-implemented method for malicious code detection. An emulator is initialized, and import dynamic link libraries are processed. Instructions of a target program are emulated using the emulator. Select application programming interface calls are intercepted using an intercept list during the program emulation.

10 Claims, 6 Drawing Sheets

FIG. 5    500

COMPUTER APPARATUS AND METHOD FOR NON-INTRUSIVE INSPECTION OF PROGRAM BEHAVIOR

BACKGROUND

1. Field of Art

The present invention generally relates to the field of malicious code detection.

2. Description of the Related Art

Conventional anti-virus software protection is typically reactionary. It is reactionary in that the anti-virus software is updated to protect a computer from malware only after the malware is released. Unfortunately, this means that at least some computers will be infected before anti-virus software is updated. Furthermore, the anti-virus update cycle is a costly process.

It is highly desirable to improve protection against malware which may be provided by antivirus software. In addition, it is highly desirable to improve the performance efficiency of, and decrease the intrusion which may be caused by, antivirus software.

SUMMARY

One embodiment relates to a computer apparatus configured with malicious code detection. Data storage is configured to store computer-readable instructions and data, and a processor is configured to execute computer-readable instructions and to access said data storage. Computer-readable code is configured to initialize an emulator and process import dynamic link libraries. Computer-readable code is also configured to emulate instructions of a target program using the emulator. Furthermore, computer-readable code is configured to intercept select application programming interface calls using an intercept list during the program emulation.

Another embodiment relates to a computer-implemented method for malicious code detection. An emulator is initialized, and import dynamic link libraries are processed. Instructions of a target program are emulated using the emulator. Select application programming interface calls are intercepted using an intercept list during the program emulation.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Applicants have determined that prior technologies to monitor program behavior have certain flaws and disadvantages. For example, one prior technology involves hooking system APIs (i.e. redirection to stub DLLs) on the actual running system (the real system). However, hooking system APIs may cause interoperability issues. Worse yet, when monitoring a malicious process, the system may already be detrimentally affected prior to the system API hooking. For example, a file infection may have already gone through and occurred.

The present application discloses a method and apparatus for monitoring program execution behavior without hooking system APIs on the real system. Advantageously, this technique secures the monitoring task and avoids substantial impact to the real system.

In accordance with an embodiment of the invention, a virtual system is constructed for the program emulation, inspection and behavior monitoring. However, unlike VMWare® software or other virtualization tools, the virtual system is constructed without modifications to real system resources, such as the file system, registries, and the internal kernel objects. Furthermore, no additional guest OS (operating system) installation is required.

Computer Apparatus

Figure 1:
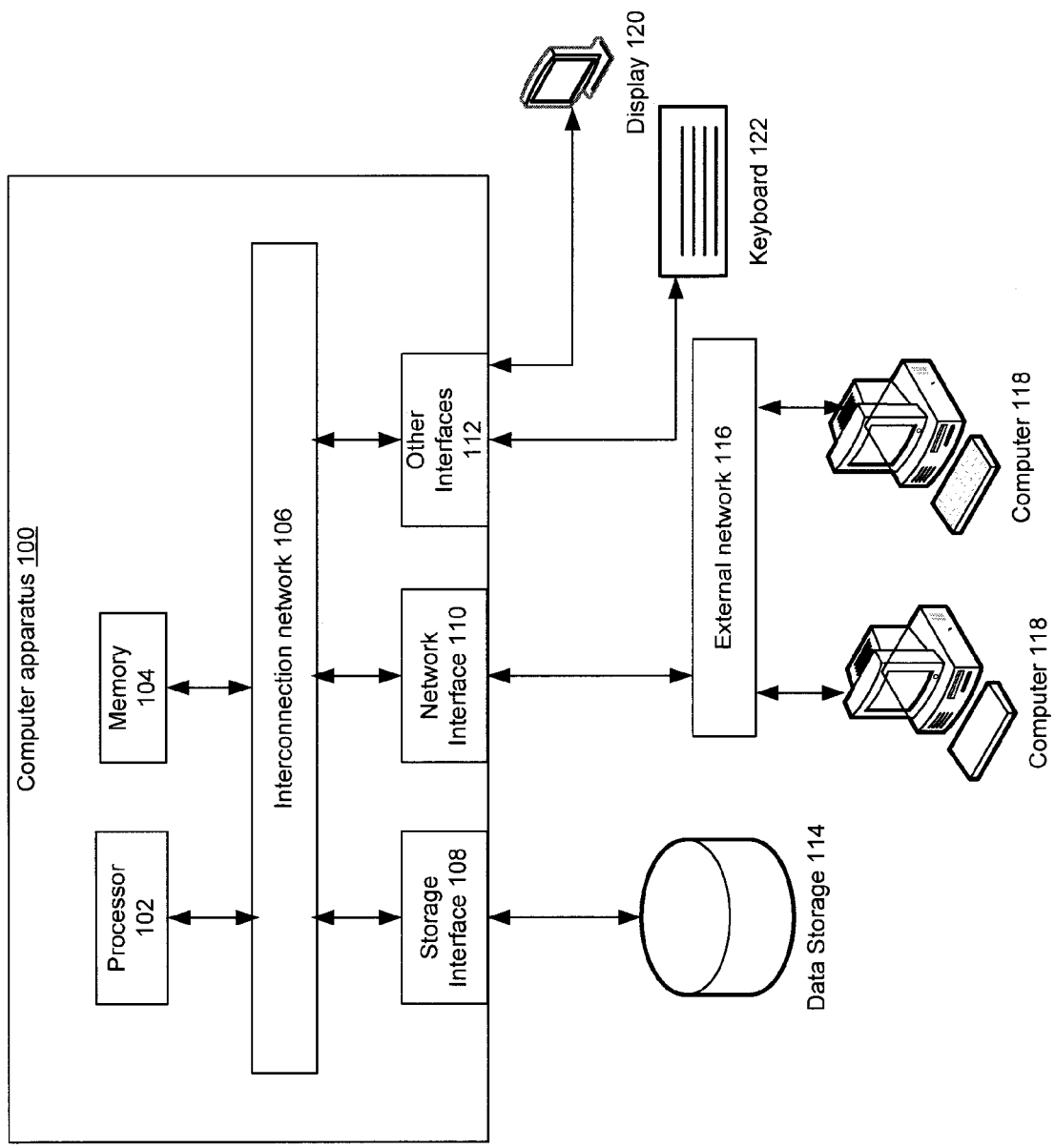
FIG. 1 is a schematic diagram depicting an example computer apparatus 100 which may be configured to perform various method steps in accordance with an embodiment of the invention.

FIG. 1 is a schematic diagram depicting an example computer apparatus 100 which may be configured to perform various method steps in accordance with an embodiment of the invention. Other designs for the computer apparatus may be used in alternate embodiments.

As shown in FIG. 1, the computer apparatus 100 comprises a processor 102, a computer-readable memory system 104, a storage interface 108, a network interface 110, and other interfaces 112. These system components are interconnected through the use of an interconnection network (such as a system bus or other interconnection system) 106. The memory 104 may be configured to include, in addition to other components and data, processor-executable instructions to perform various method steps disclosed herein.

The storage interface 108 may be used to connect storage devices 114 to the computer apparatus 100. The network interface 110 may be used to communicate with other computers 118 by way of an external network 116. The other interfaces may interface to various devices, for example, a display 120, a keyboard 122, and other devices.

Non-Intrusive Inspection of Program Behavior

Conventional solutions for monitoring program behavior include either using a complex virtualized solution or directly hooking application programming interfaces (APIs) from the real system. The largest effort for these solutions typically involves the implementation of the system dynamic link libraries (DLLs) in the virtual solution or taking the risk to modify the entry of the API in the direct hooking solution. In either case, the aim is to gather API information.

The present application discloses an alternative technique for program behavior inspection that advantageously reduces the required effort to implement a solution. The disclosed technique provides for a capability to inspect program behavior without requiring API hooking and without needing to implement DLL wrappers.

Figure 2:
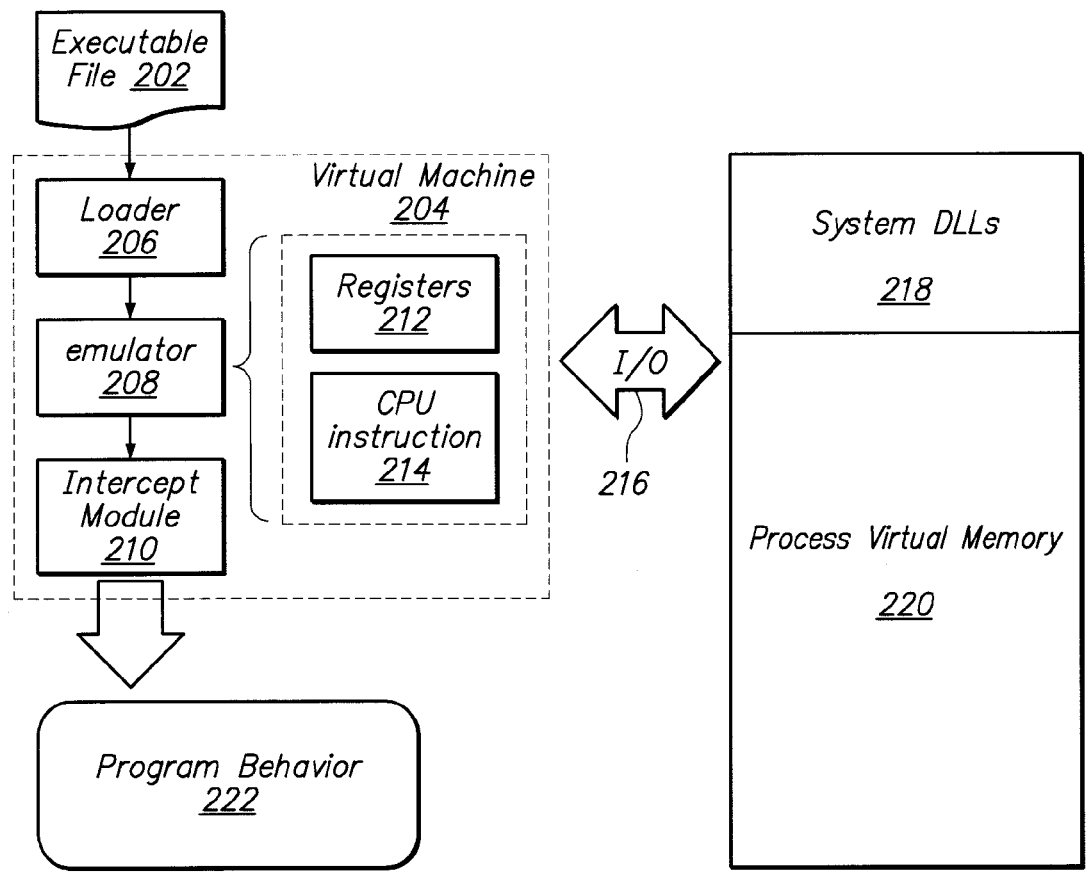
FIG. 2 is a schematic diagram depicting a virtual machine in accordance with an embodiment of the invention.

FIG. 2 is a schematic diagram depicting a virtual machine 204 in accordance with an embodiment of the invention. As shown, the virtual machine 204 includes a loader 206, an emulator 208, and an intercept module 210. The emulator 208 includes virtual registers 212 and CPU instructions 214 to be emulated. As seen, an image (i.e. a copy) of the input executable file 202 may be loaded into and run within the virtual machine 204.

In accordance with an embodiment of the invention, the virtual machine 204 may communicate with the system DLLs 218 and the process virtual memory 220. Such communication may occur by way of an input/output (I/O) interface 216. In addition, a program behavior analyzer 222 may receive behavior-related data from the intercept module 210 of the virtual machine 204.

Figure 3:
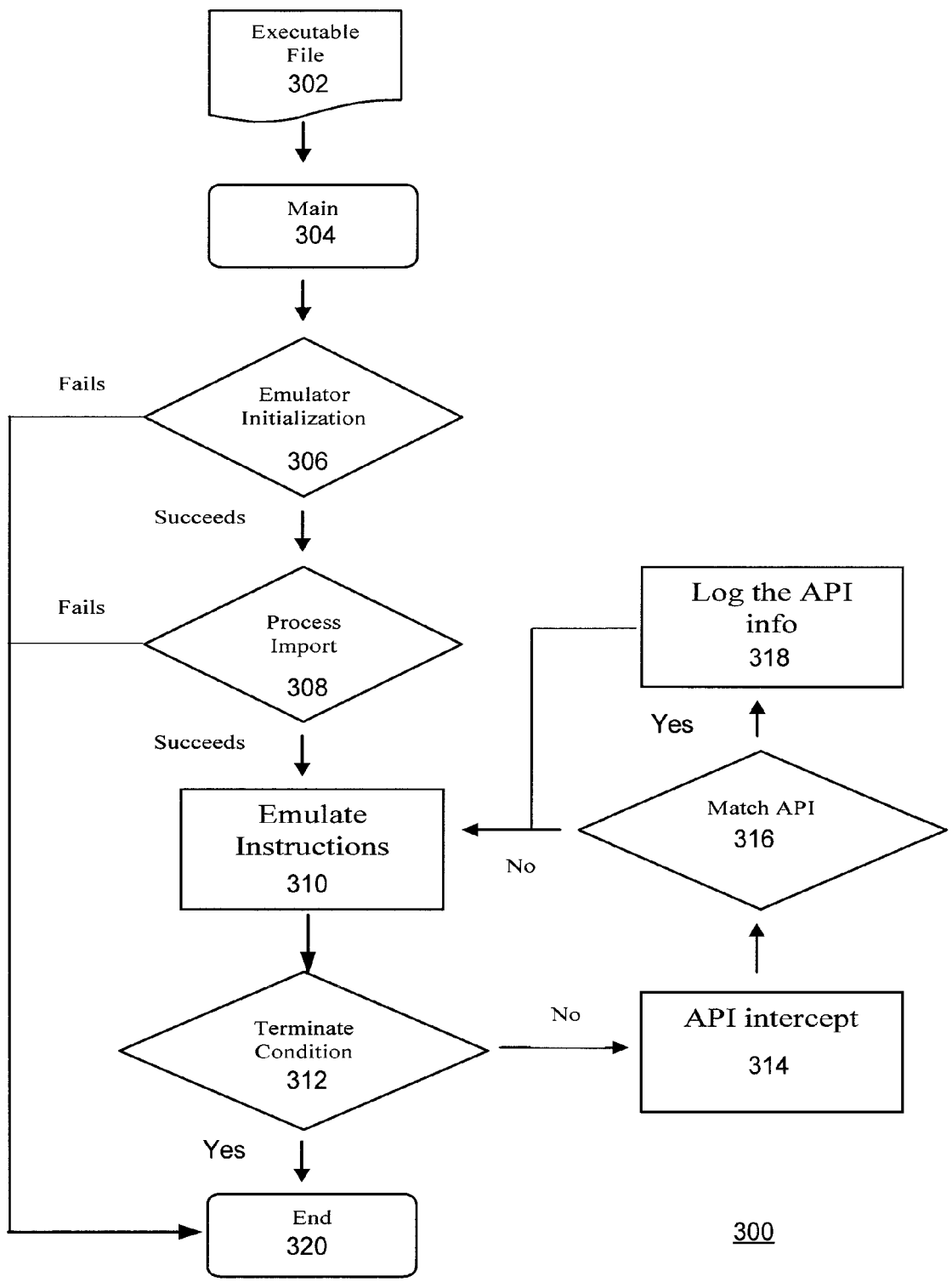
FIG. 3 is a flow chart depicting a computer-implemented method of emulation in accordance with an embodiment of the invention.

FIG. 3 is a flow chart depicting a computer-implemented method 300 of emulation in accordance with an embodiment of the invention. The method provides the functionalities to emulate the create process procedure and to emulate the program as if the program were miming on a real WINDOWS operating system.

In accordance with one embodiment, an executable file 302 of interest is loaded by the main routine 304 of the program behavior inspector. The main routine 304 then initializes 306 the emulator. The emulator initialization 306 is described in further detail below in relation to FIG. 4.

If the initialization 306 fails, then the procedure ends 320. Otherwise, if the emulator initialization 306 succeeds, then the procedure goes on to process import DLLs 308. The processing of import DLLs 308 is described in further detail below in relation to FIG. 4.

If the processing of import DLLs 308 fails, then the procedure ends 320. Otherwise, if the processing of import DLLs 308 succeeds, then the procedure goes on to emulate instructions 310. The instruction emulation 310 is described in further detail below in relation to FIG. 4.

The instruction emulation 310 continues until a terminate condition 312 is met. If a terminate condition 312 is met, then the procedure ends 320. Until then, API calls are intercepted 314 and a determination 316 is made as to whether each of the intercepted API calls has a match in a list or data structure of API calls of interest. If a match is found, then the intercepted API call information is logged 318. Otherwise, the information is not logged and the procedure continues to monitor the instruction emulation 310.

Figure 4:
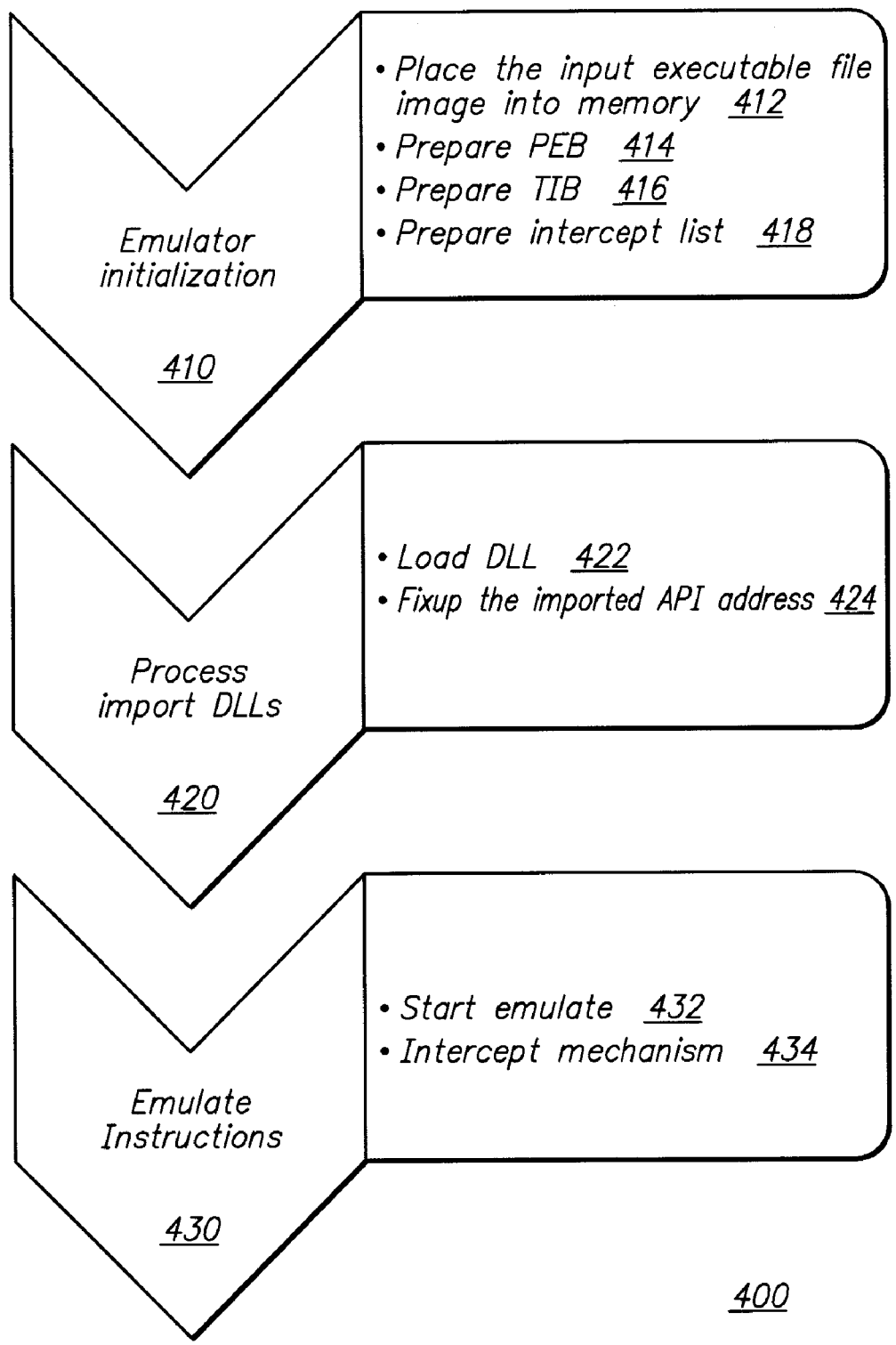
FIG. 4 is a schematic diagram showing three phases of the computer-implemented method in accordance with an embodiment of the invention.

FIG. 4 is a schematic diagram showing three phases of the computer-implemented method 400 in accordance with an embodiment of the invention. In a first phase 410, the emulator is initialized. In a second phase 420, import DLLs are processed. In a third phase 430, instruction emulation is performed and monitored.

The first phase (emulator initialization) 410 includes placing the input executable file into memory 412. This may be accomplished using the LoadLibrary API to load the input file into virtual memory, processing the process environment (PE) header to gather the PE information, and assigning an entry pointer to the EIP of the emulator. Also, the method allocates virtual memory to be the emulator's stack (depending on the stack reserve size), and assigns virtual memory to be the emulator's ESP register. Subsequently, when the emulator starts to emulate the program, the emulator will fetch instructions from the location pointed to by the EIP, and the emulator will use the emulator's stack to store values to be operated upon and parameters for API calls.

In accordance with an exemplary embodiment, after the emulator has been initialized and the input file loaded into memory, a process environment block (PEB) 414 and a thread information block (TIB) 416 are created by the system loader and prepared for program emulation purposes. PEB and TIB are memory blocks allocated by the system loader, and each of them contains information which may be advantageously modified to better control the program execution inside the emulator. This improves the accuracy of the program emulation so that it is like the program is running in the real system. Various data in the PEB and/or TIB is advantageously reformatted. For example, a malware may check whether or not it is being executed in a debugger. The malware may do so, for instance, by checking the debugger flag inside the PEB, or getting the command line string from the PEB, or manipulating the structured exception handling (SEH) to change the program execution flow by modifying the SEH frame from the TIB. Other virtualization solutions do not provide such functionality and so may lead to emulation failure or incorrect execution.

In further accordance with an exemplary embodiment, an intercept list (or intercept data structure) 418 is also prepared for program emulation purposes. The intercept list is a predefined data structure that includes the API names which are desired to be intercepted and the number of parameters each API has. The intercept list may be hard-coded inside the code for the program behavior inspection, or it may be placed outside the code in a data file. The intercept list is advantageously used so that APIs may be intercepted without hooking and without overwriting the API behavior.

After the emulator initialization is completed, the second phase (processing of import DLLs) 420 is performed. Exemplary steps for the second phase 420 are discussed in relation to FIG. 5.

In accordance with an embodiment of the invention, the second phase 420 includes loading import DLLs into process memory 422. The import DLLs are the DLLs named in the import table (see DLL name 502). The loading of an import DLL into process memory may be performed by using a LoadLibrary call (see LoadLibrary 504). If loading the import DLL is not successful, then a failure indication may be returned (Return Fail 506). Otherwise, if loading the import DLL is successful, then the procedure fixes-up (modifies) the imported API addresses 424.

Fixing-up an imported API address may be accomplished, for example, by way getting the API name from the import table 508 and then using the GetProcAddress function 510 to get the API offset from the corresponding import DLL. If getting the API offset fails, then a failure indication may be returned (Return Fail 506). Otherwise, if getting the API offset succeeds, then the procedure writes the API offset for that entry to the specified field 512.

Figure 5:
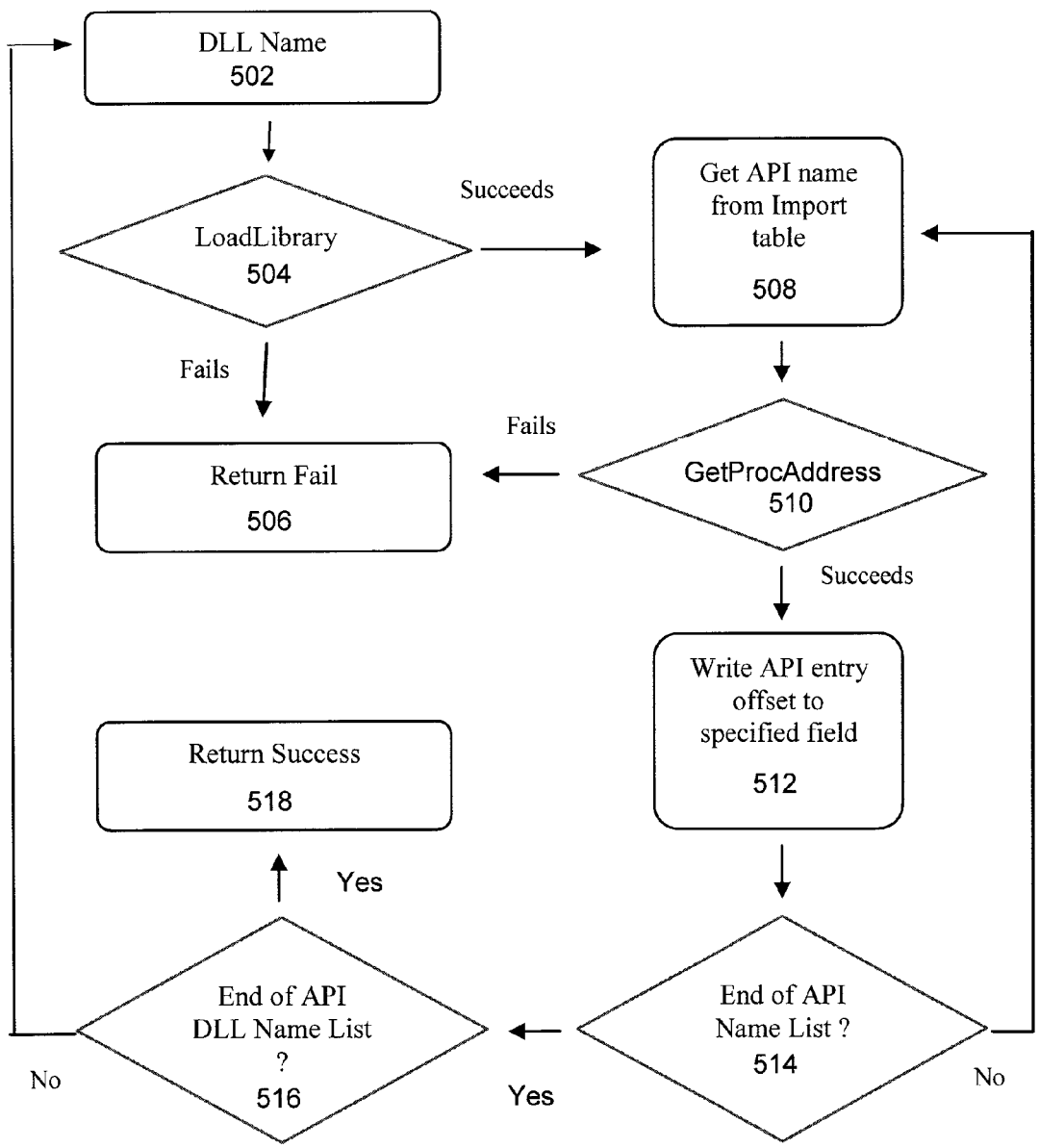
FIG. 5 is a flow chart depicting the processing of import dynamic link libraries (import DLLs) in accordance with an embodiment of the invention.

As shown in FIG. 5, the procedure 500 continues in a first loop through the API names in the import table (508) and getting (510) and writing (512) the API offsets until the end of the API name list for that DLL is reached 514. In addition, the procedure also continues in a second loop through the DLL names in the import table (502) until the end of the DLLs to be loaded is reached 516. When the last DLL is so processed, a success indication may be returned 518.

In accordance with an embodiment of the invention, the third phase 430 involves emulation of file execution 432 and utilizes an intercept mechanism 434.

The virtual machine 204 starts to emulate instructions of the executable file (432) one by one from the entry by fetching the op codes. In an exemplary embodiment, the virtual machine has implemented an x86 instruction set for emulating functions. The emulated functions may be defined as function pointers, based on the op codes. The function pointer array may use the op code as an index to dispatch what emulated function needs to execute. The emulation may continue until program termination or occurrence of an exception.

Figure 6:
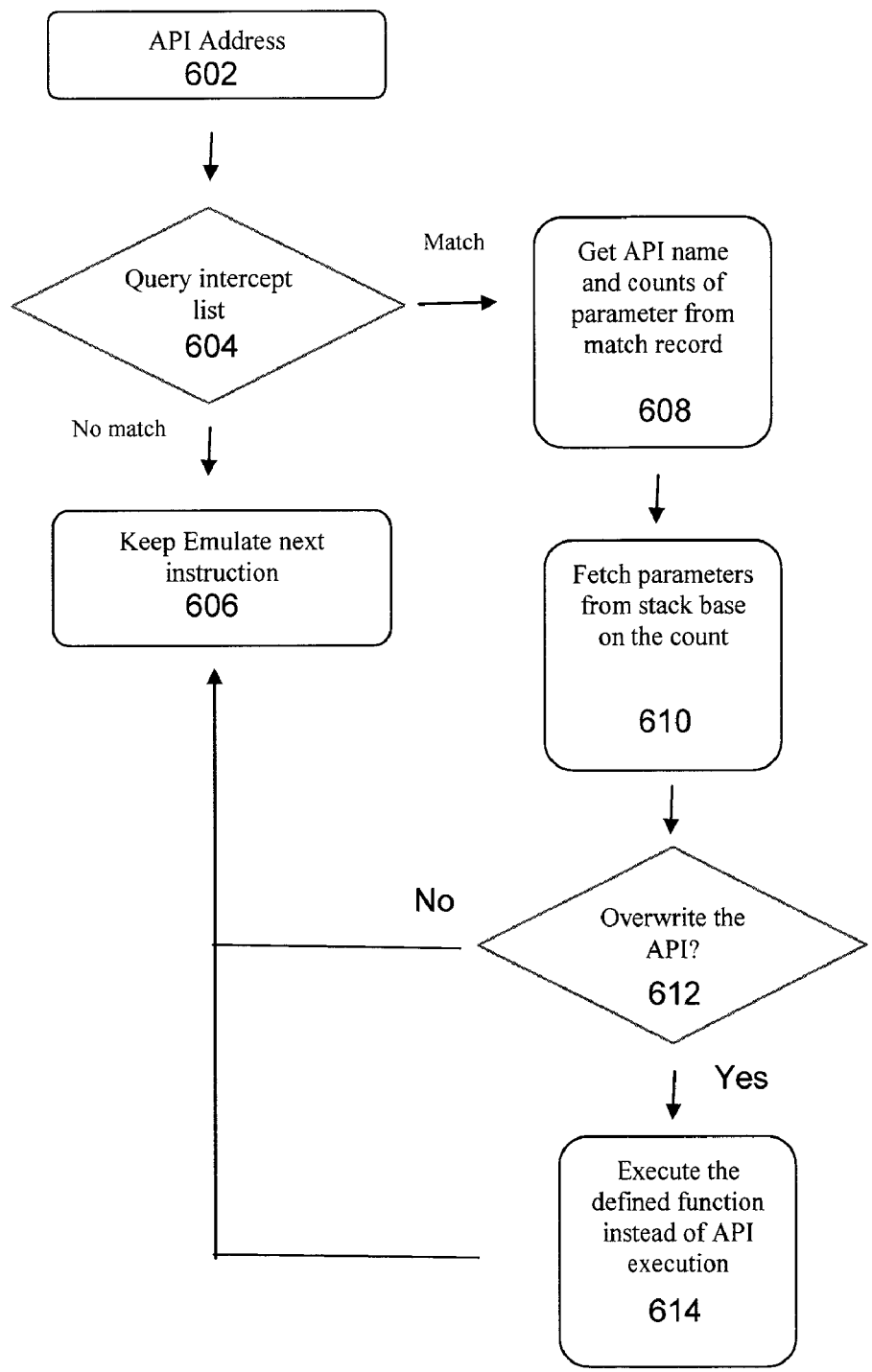
FIG. 6 showing an intercept flow in accordance with an embodiment of the invention.

An exemplary embodiment of the procedure 600 used by the intercept mechanism is depicted in FIG. 6. During the emulation of instructions, API calls are led by op code 0xFF 0x15 (Call Far) or 0xFF 0x25 (Jump Far), and in some special cases using 0xC3 (Ret). Within those instruction functions, a function is inserted to determine if the calling API address (602) matches one of the records within a predefined intercept list (604).

The predefined intercept list includes API names and how many parameters each API has (counts of parameters). Preferably, the APIs on the intercept list are those that are known to be frequently used by malicious programs. Hence, by monitoring these APIs, the procedure may identify harmful actions performed by malicious programs.

If there is no match between the API address and the intercept list, then the procedure continues to emulate the next instruction (606). The emulation and the matching of API addresses with the intercept list continues until program termination or occurrence of an exception.

On the other hand, if there is a match between the API address and the intercept list, then the procedure obtains the API name and the number of parameters for that API from the match record (608). The parameters are then fetched from the stack base (610).

In accordance with an embodiment of the invention, a determination may then be made as to whether or not to overwrite the API (612). If the API is not to be overwritten, then the virtual machine executes the original API and then continues on to emulate the next instruction (606). If the API is to be overwritten, the virtual machine executes a previously defined overwrite function (614), instead of the original API. The defined function is configured to obtain extra information and/or redirect input/output. Information gathered by the defined function may be used by an intelligent quarantine engine to detect programs that behave maliciously. Various techniques may be used by the intelligent quarantine engine.

The above-described solution is technologically advantageous over one which uses VMWare® software. This is because VMWare® software requires installation of a guest operating system (OS), such as Windows® or Linux® operating systems. The VMWare® software then may act like a real machine to execute the installed guest OS. In contrast, the presently-disclosed solution does not require installation of a guest OS.

The above-described solution is also technologically advantageous over solutions which utilize "stub DLLs" (system DLL wrappers). In such solutions, when the program being emulated calls to the interface of the stub DLLs (instead of the real DLLs), the stub DLLs gather the API information. In contrast, the presently-disclosed solution does not need to implement stub DLLs because the real DLLs from the live system are used instead.

These technological advantages lead to better performance in program emulation. This is because the presently-disclosed solution does not use a virtual machine management (VMM) layer. The conventional VMM layer manages interactions between guest and host, and these interactions usually cause performance-reducing context switching to occur.

In addition, the presently-disclosed solution provides more full emulation of the user's environment. This enables the detection of certain malicious codes that can only exploit certain versions of the environment. Other solutions providing less full emulation of the user's environment may fail to detect these malicious codes.

In other words, the presently-disclosed solution implements an x86-based emulator and directly runs in the real OS environment. This is distinct from other virtualization solutions which involve either installing a guest OS or implementing system DLL wrappers to gather API information. This means that the program emulation of the presently-disclosed solution has the capabilities to perform actions in a real computing environment when calling certain APIs, such as creating a file or even receiving files from the Internet. These capabilities enable detection of malicious behaviors which may elude detection by conventional solutions.

CONCLUSION

The method disclosed herein emulates the behavior of a real operating system in an advantageous manner so as to enable non-intrusive inspection of program behavior. This provides better security protection to detect malicious software variants using a technique other than signature matching. Inspection is performed during secure program execution before the program is actually executed on the user's system. The secure program execution is advantageously implemented to leave no leftover files and no inserted run keys without a user's awareness.

The features and advantages described in the specification provide a beneficial use to those making use of a system and a method as described in embodiments herein. For example, a user is provided mechanisms, e.g., by receiving and/or transmitting control signals, to control access to particular information as described herein.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Upon reading this disclosure, those of skill in the art will appreciate still additional alternative structural and functional designs for a system and a process for a matching engine to query relevant documents, which may include a signature generation and relevance detection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer apparatus configured with malicious code detection, the apparatus comprising:
    data storage configured to store computer-readable instructions and data;
    a processor configured to execute computer-readable instructions and to access said data storage;
    computer-readable code configured to initialize an emulator;
    computer-readable code configured to create a process environment block which is modified to control a process environment of a program being executed by the emulator;
    computer-readable code configured to create a thread information block which is modified to control a thread being executed by the emulator;
    computer-readable code configured to process import dynamic link libraries;
    computer-readable code configured to emulate instructions of a target program using the emulator;
    computer-readable code configured to intercept select application programming interface calls using an intercept list during the program emulation;
    computer-readable code configured such that, if a calling application programming interface address matches a record in the intercept list, then the application programming interface name and number of parameters are retrieved from the match record;
    computer-readable code configured to fetch said parameters from a stack base; and
    computer-readable code configured to determine whether to overwrite the application programming interface, and if the application programming interface is to be overwritten, then executing a previously defined function.

2. The computer apparatus of claim 1, wherein the previously defined function gathers information to be used by an intelligent quarantine engine so as to detect malicious code.

3. The computer apparatus of claim 1, further comprising:
    computer-readable code configured to load dynamic load libraries named in an import table for the target application;
    computer-readable code configured to use a GetProcAddress function to get application programming interface offsets for application programming interfaces names in the import table; and
    computer-readable code configured to write the offsets to specified fields.

4. The computer apparatus of claim 1, wherein a debugger flag inside the process environment block is reformatted.

5. The computer apparatus of claim 1, wherein a structured exception handling frame from the thread information block is reformatted.

6. A computer-implemented method for malicious code detection, the method comprising:
    initializing an emulator being executed by a computer;
    creating a process environment block which is modified to control a process environment of a program being executed by the emulator;
    creating a thread information block which is modified to control a thread being executed by the emulator;
    processing import dynamic link libraries by the emulator;
    emulating instructions of a target program using the emulator; and
    intercepting select application programming interface calls using an intercept list during the program emulation by the emulator;
    if a calling application programming interface address matches a record in the intercept list, then retrieving, by the emulator, the application programming interface name and number of parameters from the match record; and
    fetching said parameters, by the emulator, from a stack base;

determining, by the emulator, whether to overwrite the application programming interface, and if the application programming interface is to be overwritten, then executing a previously defined function.

7. The method of claim 6, wherein the previously defined function gathers information to be used by an intelligent quarantine engine so as to detect malicious code.

8. The method of claim 6, further comprising:

loading, by the emulator dynamic load libraries named in an import table for the target application;

getting, by the emulator, application programming interface offsets for application programming interfaces names in the import table; and writing the offsets to specified fields.

9. The method of claim 6, wherein a debugger flag inside the process environment block is reformatted.

10. The method of claim 6, wherein a structured exception handling frame from the thread information block is reformatted.

* * * * *